(12) United States Patent
Hui et al.

(10) Patent No.: US 7,488,415 B2
(45) Date of Patent: *Feb. 10, 2009

(54) DISPOSABLE SALT CHLORINE GENERATOR

(75) Inventors: Joseph W. Hui, Cupertino, CA (US); Richard Holstein, Lakewood, NJ (US)

(73) Assignee: Smartpool Incorporated, Lakewood, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/529,519

(22) Filed: Sep. 29, 2006

(65) Prior Publication Data

US 2007/0084770 A1   Apr. 19, 2007

Related U.S. Application Data

(60) Provisional application No. 60/722,445, filed on Oct. 3, 2005.

(51) Int. Cl.
*C02F 1/32* (2006.01)

(52) U.S. Cl. .................. 210/167.11; 210/192; 210/748; 204/286.1

(58) Field of Classification Search ................. 210/748, 210/756, 167.01, 167.1, 167.11, 192; 204/286.1, 204/297.01
See application file for complete search history.

(56) References Cited

U.S. PATENT DOCUMENTS

| 4,097,356 | A |   | 6/1978 | Yates |
| 4,992,156 | A |   | 2/1991 | Silveri |
| 4,997,540 | A | * | 3/1991 | Howlett ...................... 204/271 |
| 5,228,964 | A | * | 7/1993 | Middleby ................... 204/194 |
| 5,580,438 | A | * | 12/1996 | Silveri ........................ 205/687 |
| 7,014,753 | B2 | * | 3/2006 | Holstein et al. ............. 210/136 |
| 2006/0076282 | A1 | * | 4/2006 | Hui et al. .................... 210/169 |

FOREIGN PATENT DOCUMENTS

| EP | 1 647 525 A1 |   | 4/2006 |
| JP | 11-77055 | * | 3/1999 |
| WO | WO-2005/009906 A3 |   | 2/2005 |

* cited by examiner

*Primary Examiner*—Fred Prince
(74) *Attorney, Agent, or Firm*—Birch, Stewart, Kolasch & Birch, LLP

(57) ABSTRACT

A disposable salt chlorine generator for use in conjunction with a swimming pool, spa, hot tub or large vessel of water includes a bracket for mounting a housing on a wall of a swimming pool, spa, hot tub or large vessel of water. The housing is releasable mounted relative to said bracket and contains a compartment wherein a halogen-producing electrode configuration is removably mounted relative to the compartment. An electrical cable is operatively connected to the halogen producing electrode configuration for providing electrical power thereto.

9 Claims, 4 Drawing Sheets

DISPOSABLE SALT CHLORINE GENERATOR

This Non-provisional application claims priority under 35 U.S.C. § 119(e) on U.S. Provisional Application No(s). 60/722,445 filed on Oct. 3, 2005, the entire contents of which are hereby incorporated by reference.

BACKGROUND OF THE INVENTION

1. Field of the Invention

The present invention relates to a disposable halogen producing electrolytic cell for chlorinating a swimming pool, spa, hot tub, fountain or other large vessel by positioning the unit on a wall inside the vessel to be chlorinated and permitting water to flow through the unit.

2. Description of Background Art

Disinfection of swimming pools, spas, hot tubs, fountains or other large vessels normally requires the circulation of water through a halogen type disinfectant or by halogen generated within a cell inserted into the plumbing of the filtration loop.

These halogen generation systems generally require 1) cutting or adding the generation cell to the filtration pipe loop or 2) attaching the cell to existing fittings within the body of water.

A common difficulty of the first type is the high cost and large size of the electrodes, which require extensive electronic monitoring equipment to ensure safety and proper disinfection. These systems require that the operation of the electrodes inside the cell coincide with the operation of the existing circulation pump. Sensors must be used to ensure circulation and to accommodate the entrapment of gases produced during the generating process. The second type of system requires the immersion of electrodes under the surface of the water either attached to the inside of the vessel wall or attached to an existing fitting inside the vessel. The difficulty with this embodiment is the necessity to insert wiring through the vessel wall and route wires through existing pool piping which precludes access to the wires for service or replacement and which makes it difficult to remove the electrodes plates for replacement, cleaning or winterizing.

SUMMARY OF THE INVENTION

The present invention is designed to permit a disposable unit to be readily, removably mounted adjacent to a wall of a swimming pool, spa, hot tub, fountain or other large vessel for positioning an electrolytic cell that produces halogen disinfectants directly in the water. The unit may be disposed of by easily detaching the unit from the mounting bracket.

These and other objects of the present invention are achieved by a providing a disposable halogen producing electrolytic cell in a housing that is removably mounted to a bracket positioned on the wall of a swimming pool, spa, hot tub, fountain or other large vessel. The bracket includes an electrical cable to permit low voltage current to be supplied to the halogen producing electrolytic cell for generating chlorine.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DETAILED DESCRIPTION OF THE PREFERRED EMBODIMENTS

Figure 1:
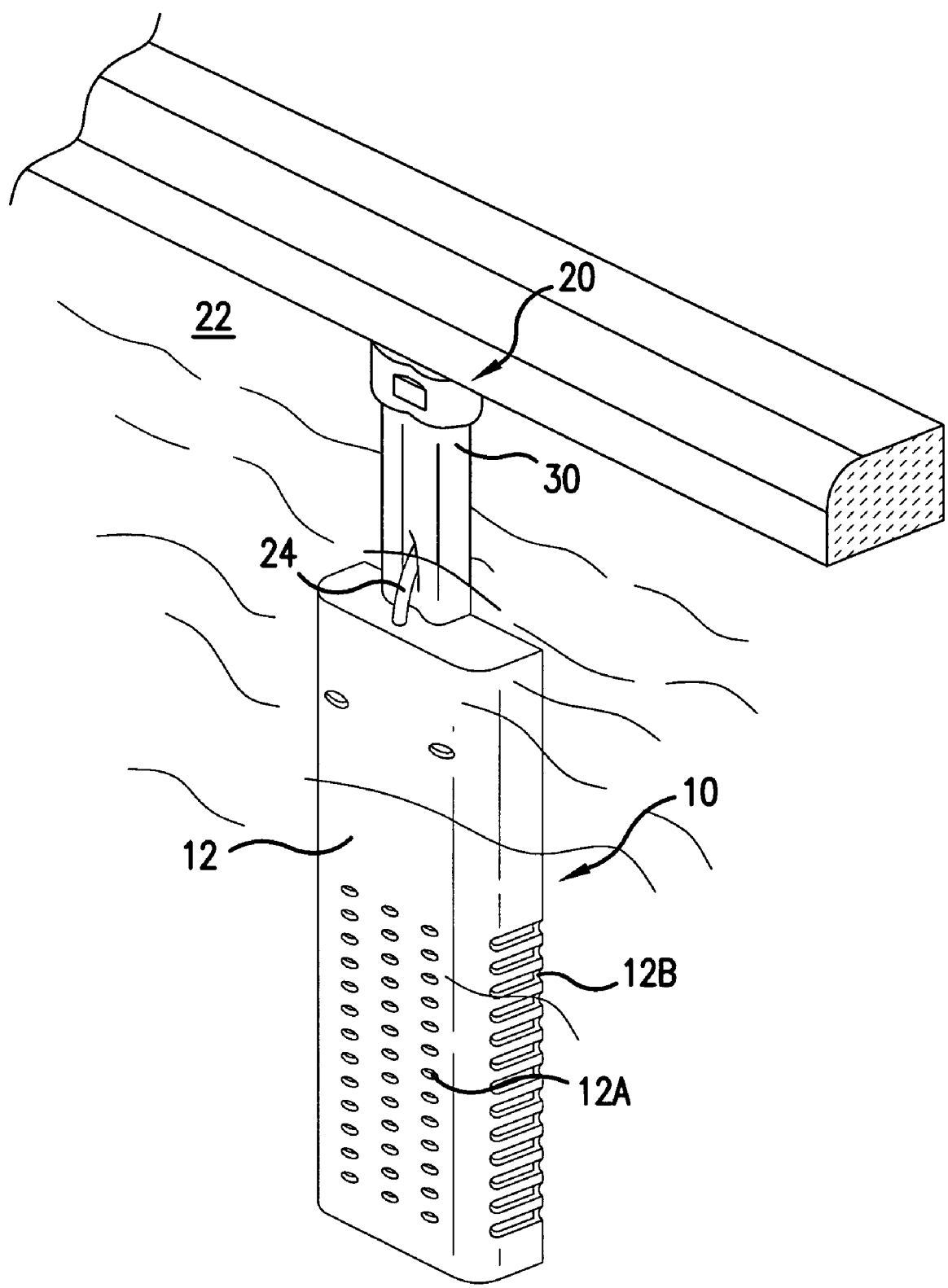
FIG. 1 is perspective view illustrating a housing for containing a halogen producing electrolytic cell mounted adjacent to a wall of a swimming pool.
Figure 2:
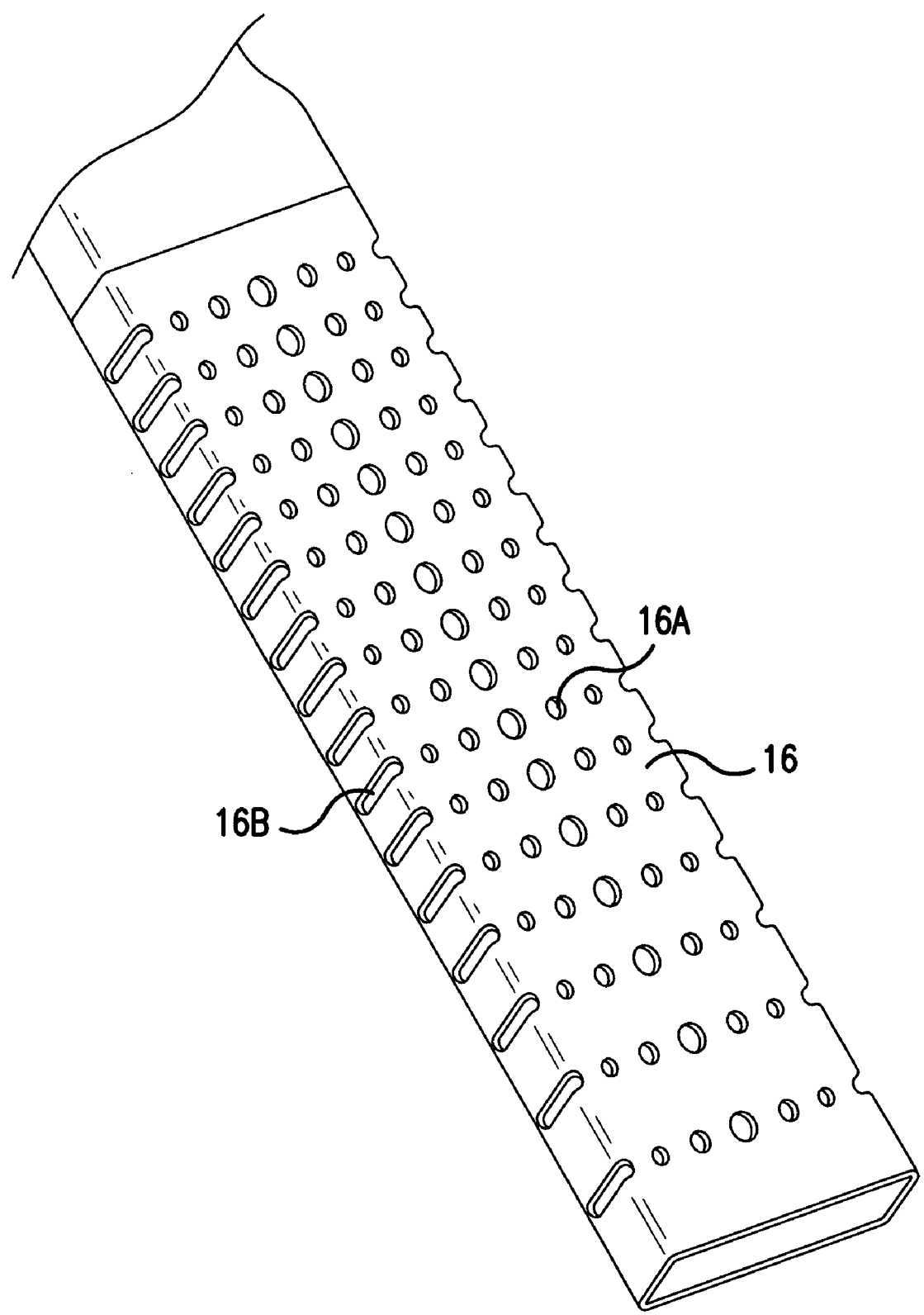
FIG. 2 is a perspective view of the venting for the back of the housing.
Figure 3:
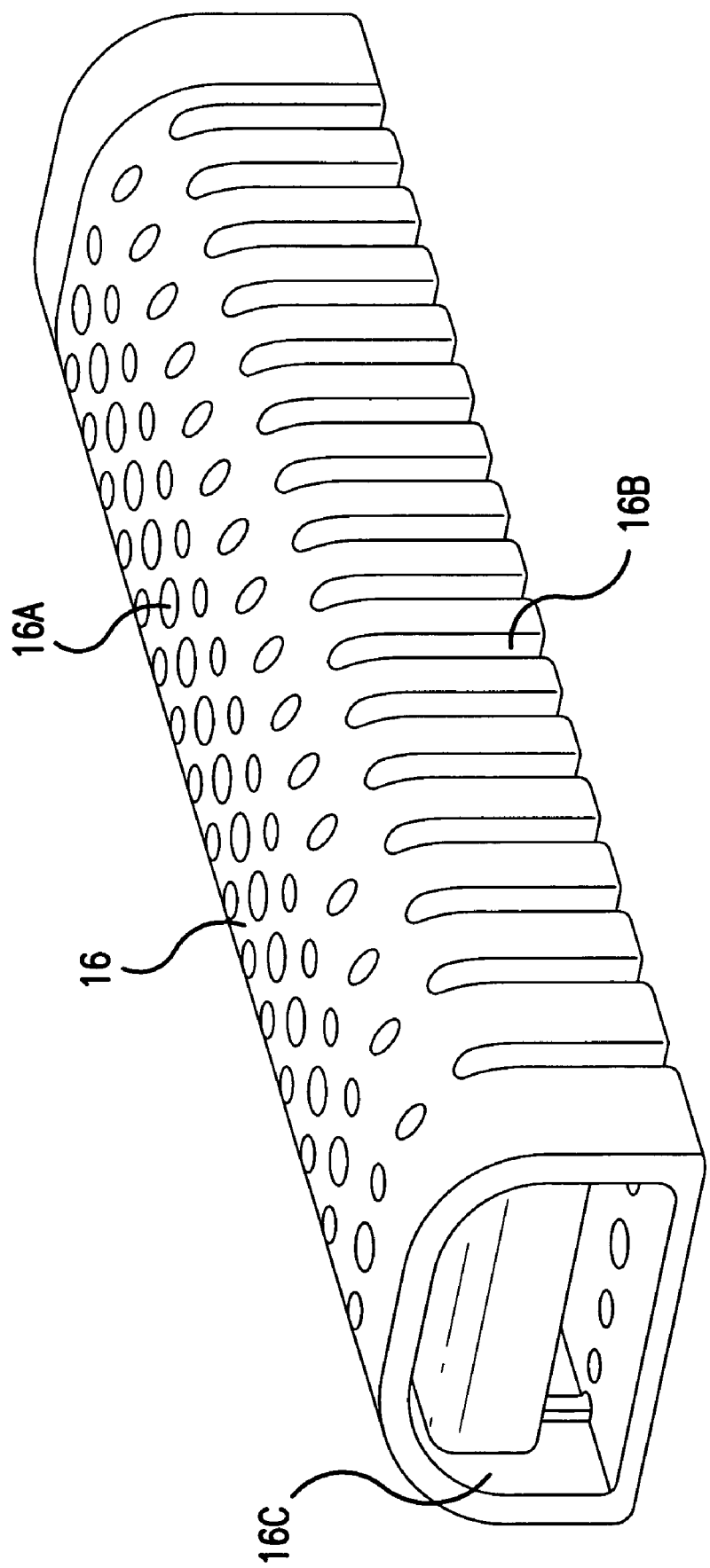
FIG. 3 is a perspective view illustrating the open bottom for the housing.
Figure 4:
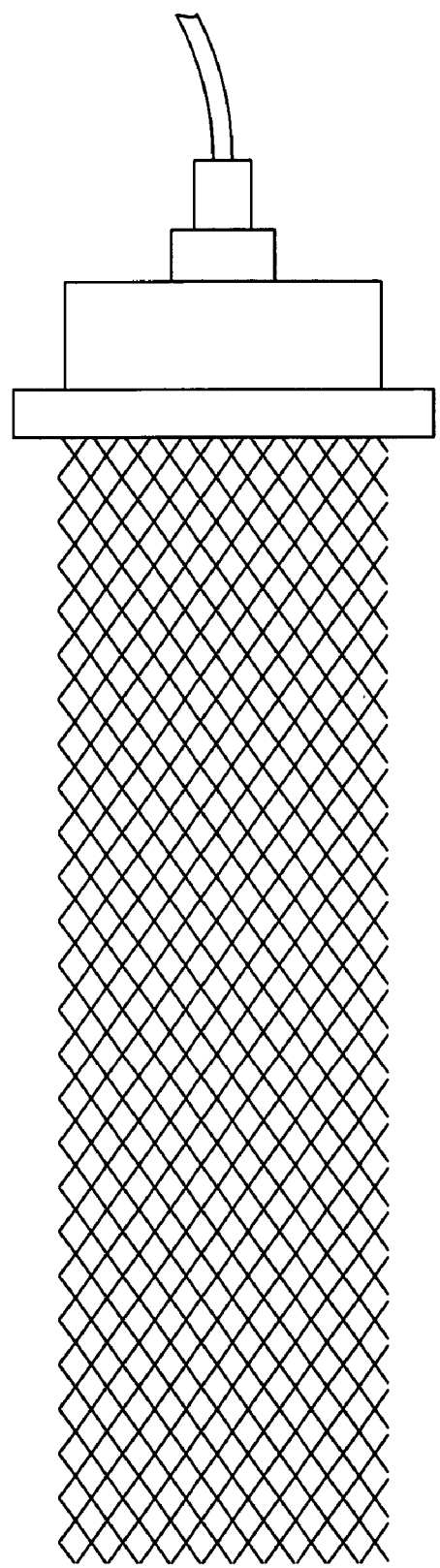
FIG. 4 illustrates the internal halogen producing electrolytic cell.

As illustrated in FIGS. 1-3, a salt chlorine generator 10 is designed as a disposable generator for use in conjunction with a swimming pool, spa, hot tub or large vessel of water. A bracket 20 is adapted to be mounted on a wall 22 of a swimming pool, spa, hot tub or large vessel of water. A housing 12 contains a compartment for positioning a halogen-producing electrode configuration 16. The halogen-producing electrode configuration 16 is removably mounted relative to the compartment in the housing 12. The housing 12 is releasable mounted relative to the bracket 20. An electrical cable 24 provided for supplying volt voltage to the halogen producing electrode configuration 16.

The halogen producing electrode configuration 16 includes electrical plates for being supplied with power from the electrical cable 24 for causing an electrolysis process to occur. During the electrolysis process chlorine gas is produced which combines with the water to form sodium hypochlorite to sterilize the water. Hydrogen gas is also produced during the process which rises through the plurality of apertures 12A and 12B in the housing 12 to produce convection currents for causing the water to circulate through the housing 12. In addition, a halogen producing electrode configuration 16 includes a cover with a plurality of apertures 16A and 16B positioning on the surface thereof.

After the halogen-producing electrode configuration 16 is positioned within the compartment in the housing 12 the plurality of apertures 12A and 12B permit align with the plurality of apertures 16A and 16B for permitting water to flow into the compartment within the housing 12 for producing chlorine gas which combines with the water to form sodium hypochlorite.

The extension member 30 extends from the bracket 20 to conceal a portion of the electrical cable 24 and to mount the housing 12 at a predetermined distance below a water line in the swimming pool, spa, hot tub or large vessel of water.

Low voltage power is provided to the electrodes through a transformer provided as part of the system. The system may be connected to an existing GFCI electrical outlet utilizing a common 3-prong plug or twist-lock plug commonly used around pools, spas, hot tubs, fountains or other vessels. If preferred, a licensed electrician can also make the electrical connection by connecting wires directly onto a GFCI circuit.

A transformer is provided together with the system for producing low voltage for supplying power for operating the salt chlorine generator.

In operation, a suitable amount of sodium chloride is dissolved in the water. Thereafter, the water would enter the apertures 12A and 12B in the housing 12 and the water would come into contact with the halogen producing electrolytic cell 16 by entering the plurality of apertures 16A and 16B and the open bottom portion 16C for generating chlorine gas that combines with the water to form sodium hypochlorite which is supplied to the pool, spa or hot tub or other vessel. A continuous level of chlorine will be generated to ensure that the appropriate level of chlorine is present in the pool, spa or hot tub or other vessel without the need for turning on the pool or spa pump.

The halogen producing electrolytic cell 16 is supplied with a low voltage source of power of approximately 2-12V. A timer or other circuitry may be connected to the halogen producing electrolytic cell 16 to permit the unit to be periodically turned on and off or to adjust the level of output to the electrolytic cell.

The halogen producing electrolytic cell 16 is designed to be disposable to permit a user to merely dispose of the halogen producing electrolytic cell 16 after it is used. The present invention permits the halogen producing electrolytic cell 16 to be thrown away. A user is not required to clean the halogen producing electrolytic cell 16 after use.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A disposable salt chlorine generator for use in conjunction with a swimming pool, spa, hot tub or large vessel of water comprising:
   a bracket adapted to be mounted on a wall of a swimming pool, spa, hot tub or large vessel of water;
   a disposable housing containing a compartment, said housing being releasable mounted relative to said bracket;
   a halogen-producing electrode configuration being removably mounted relative to said compartment in said housing; and
   an electrical cable is operatively connected to said halogen producing electrode configuration for supplying electrical power thereto;
   said halogen-producing electrode configuration is positioned within the compartment in the housing and a cover with a plurality of apertures is mounted on said housing for covering said halogen-producing electrode configuration positioned within said compartment.

2. The disposable salt chlorine generator for use in conjunction with a swimming pool, spa, hot tub or large vessel of water according to claim 1, wherein said halogen producing electrode configuration is positioned on a mounting member that is received within said compartment.

3. The disposable salt chlorine generator for use in conjunction with a swimming pool, spa, hot tub or large vessel of water according to claim 2, wherein said halogen producing electrode configuration includes electrical plates and further including a cover for positioning on said mounting member and for protecting the electrical plates.

4. The disposable salt chlorine generator for use in conjunction with a swimming pool, spa, hot tub or large vessel of water according to claim 1, wherein said housing including a plurality of apertures for permitting water to flow into said compartment within said housing for producing chlorine gas which combines with the water to form sodium hypochlorite.

5. A disposable salt chlorine generator for use in conjunction with a swimming pool, spa, hot tub or large vessel of water comprising:
   a bracket adapted to be mounted on a wall of a swimming pool, spa, hot tub or large vessel of water;
   a disposable housing containing a compartment, said housing being releasable mounted relative to said bracket;
   a halogen-producing electrode configuration being removably mounted relative to said compartment in said housing;
   an electrical cable is operatively connected to said halogen producing electrode configuration for supplying electrical power thereto; and
   an extension member for mounting said housing a predetermined distance below a water line in the swimming pool, spa, hot tub or large vessel of water, said extension member extends from said bracket to conceal a portion of said electrical cable and to mount said housing at a predetermined distance below the water line in the swimming pool, spa, hot tub or large vessel of water.

6. The disposable salt chlorine generator for use in conjunction with a swimming pool, spa, hot tub or large vessel of water according to claim 5, wherein said halogen-producing electrode configuration is positioned within the compartment in the housing and a cover with a plurality of apertures is mounted on said housing for covering said halogen-producing electrode configuration positioned within said compartment.

7. The disposable salt chlorine generator for use in conjunction with a swimming pool, spa, hot tub or large vessel of water according to claim 5, wherein said halogen producing electrode configuration is positioned on a mounting member that is received within said compartment.

8. The disposable salt chlorine generator for use in conjunction with a swimming pool, spa, hot tub or large vessel of water according to claim 7, wherein said halogen producing electrode configuration includes electrical plates and further including a cover for positioning on said mounting member and for protecting the electrical plates.

9. The disposable salt chlorine generator for use in conjunction with a swimming pool, spa, hot tub or large vessel of water according to claim 5, wherein said housing including a plurality of apertures for permitting water to flow into said compartment within said housing for producing chlorine gas which combines with the water to form sodium hypochlorite.

* * * * *

UNITED STATES PATENT AND TRADEMARK OFFICE
CERTIFICATE OF CORRECTION

| | | |
|---|---|---|
| PATENT NO. | : 7,488,415 B2 | Page 1 of 1 |
| APPLICATION NO. | : 11/529519 | |
| DATED | : February 10, 2009 | |
| INVENTOR(S) | : Joseph W. Hui et al. | |

It is certified that error appears in the above-identified patent and that said Letters Patent is hereby corrected as shown below:

Title Page; should read;
(60) Provisional application No. 60/722,455, filed on Oct. 3, 2005.

Signed and Sealed this

Eighth Day of June, 2010

David J. Kappos
*Director of the United States Patent and Trademark Office*